United States Patent [19]

Gsell et al.

[11] Patent Number: 5,133,878
[45] Date of Patent: Jul. 28, 1992

[54] POLYMERIC MICROFIBER FILTER MEDIUM

[75] Inventors: Thomas C. Gsell, Glen Cove; Isaac Rothman, Brooklyn; Paul C. Smith, III, Lindenhurst; Jeffrey K. Chambers, Huntington, all of N.Y.

[73] Assignee: Pall Corporation, Glen Cove, N.Y.

[21] Appl. No.: 437,612

[22] Filed: Nov. 17, 1989

[51] Int. Cl.$^5$ .............................................. B01D 39/16
[52] U.S. Cl. ................................. 210/767; 210/496; 210/497.01; 210/500.1
[58] Field of Search ...................... 210/502.1, 504-506, 210/508, 683, 767, 496, 497.01, 500.1

[56] References Cited

U.S. PATENT DOCUMENTS

| | | | |
|---|---|---|---|
| 2,957,206 | 10/1960 | Mindick et al. | 18/57 |
| 3,088,791 | 5/1963 | Cline et al. | 8/115.5 |
| 3,247,133 | 4/1966 | Chen | 260/2.1 |
| 3,565,833 | 2/1971 | Battaerd | 260/2.1 |
| 3,698,931 | 10/1972 | Horowitz | 117/47 R |
| 3,862,059 | 1/1975 | Greco et al. | 260/2.1 C |
| 4,113,430 | 9/1978 | Otto | 8/115.5 |
| 4,119,581 | 10/1978 | Rembaum et al. | 521/27 |
| 4,242,208 | 12/1980 | Kawaguchi et al. | 210/500.2 |
| 4,439,322 | 3/1984 | Sonoda et al. | 210/500.2 |
| 4,455,408 | 6/1984 | Szymanski et al. | 525/291 |
| 4,473,474 | 9/1984 | Ostreicher et al. | 210/636 |
| 4,673,504 | 6/1987 | Ostreicher et al. | 210/500.22 |
| 4,702,840 | 10/1987 | Degen et al. | 210/638 |
| 4,702,947 | 10/1987 | Pall et al. | 210/508 |
| 4,788,223 | 11/1988 | Bigwood et al. | 521/32 |
| 4,871,594 | 10/1989 | Bister et al. | 427/430.1 |
| 4,936,998 | 6/1990 | Nishimura et al. | 210/638 |
| 4,981,591 | 1/1991 | Ostreicher | 210/502.1 |
| 4,985,153 | 1/1991 | Kuroda et al. | 210/782 |

FOREIGN PATENT DOCUMENTS

| | | |
|---|---|---|
| 57-149509 | 9/1982 | Japan . |
| 59-062351 | 4/1984 | Japan . |
| 59-84924 | 5/1984 | Japan . |
| 59-219334 | 12/1984 | Japan . |
| 60-119955 | 6/1985 | Japan . |
| 60-119957 | 6/1985 | Japan . |

OTHER PUBLICATIONS

Chemical Abstracts, 91:193921m, vol. 91, 1979.
Chemical Abstracts, 91:194902t, vol. 91, 1979.
Chemical Abstracts, 91:133320w, vol. 93, 1980.
Chemical Abstracts, 101:55619t, vol. 101, 1984.
Chemical Abstracts, 107:199140b, vol. 104, 1985.
Chemical Abstracts, 109:171036q, vol. 109, 1988.

*Primary Examiner*—Ivars Cintins
*Attorney, Agent, or Firm*—Leydig, Voit & Mayer

[57] ABSTRACT

A filter medium is provided comprising a fibrous matrix to whose surfaces is grafted a superstrate comprising a polymer with quaternary ammonium groups and made from an ethylenically unsaturated monomer containing a quaternary ammonium or amino group, the filter medium having a positive zeta potential at pH 7 and preferably an enhanced Latex Adsorption Capacity together with low extractables and quick rinse-up.

33 Claims, No Drawings

POLYMERIC MICROFIBER FILTER MEDIUM

TECHNICAL FIELD

This invention relates to a polymeric fiber matrix having controlled surface properties. In particular, this invention relates to a polymeric matrix controlled so that it has an enhanced ability to remove suspended matter from fluids. More particularly, this invention relates to a polymeric fiber matrix which has a positive surface charge in aqueous solution. This invention also relates to a method for making said matrix.

BACKGROUND OF THE INVENTION

Matrices made from polymeric fibers are generally useful filter materials. They are inexpensive, are resistant to a wide variety of chemical and fluid environments, and can be made with particulate removal ratings ranging from about 0.2 $\mu$m to more than about 100 $\mu$m.

The function of a filter is the removal of suspended particulate material from fluids and the passage of the clarified fluid medium. A filter can achieve fluid clarification by different mechanisms. Particulate materials can be removed through mechanical sieving wherein all particles larger than the diameter of pores of the filter medium are removed from the fluid. With this mechanism, filtration efficiency is controlled by the size of the contaminant relative to filter pore diameter. The efficient removal of very small particles, e.g., less than about 0.1 $\mu$m in diameter, therefore requires filter media with very small pore sizes for removal by mechanical sieving. Such finely pored filter media tend to have the undesirable characteristics of high pressure drop across the filter medium, reduced dirt capacity, and shorter life.

A filter may also remove suspended particulate material by adsorption onto the filter surfaces. Removal of particulate material by this mechanism is controlled by the surface characteristics of (1) the suspended particulate material and (2) the filter medium. Most suspended solids which are commonly subjected to removal by filtration are negatively charged in aqueous systems near neutral pH. This feature has long been recognized in water treatment processes where oppositely charged, cationic flocculating agents are employed to improve settling efficiencies during water clarification.

It has been found that, if the surface charges of a particle and the filter sheet are of like sign and have differences in magnitude of greater than about 20 mV, electrostatic repulsive forces will be sufficiently strong to prevent capture by adsorption. However, if the magnitude of the zeta potentials of the suspended particles and the filter surface is small, electrostatic repulsion can be overcome by attractive Van der Waals forces and particles which encounter the filter surface will tend to adhere to the filter pore surface. Filter surfaces characterized by positive zeta potentials, however, are capable of first attracting negatively charged particles to the surface and then strongly retaining them by a combination of attractive electrostatic and Van der Waals forces. Thus, filter materials characterized by positive zeta potentials are capable of efficiently removing, by electrostatic capture, negatively charged particles much smaller than the pores of the filter.

In addition, filter surfaces having a positive zeta potential have the ability to remove many pyrogenic bacterial endotoxins (fever-inducing breakdown products of certain bacterial cell walls) from aqueous systems. A positively charged filter with high dirt capacity would be very useful as a means of purifying water from systems such as wells and storage tanks which can accumulate bacteria and their breakdown products.

There is, therefore, a need for a filter medium having an enhanced capability of filtration of fine particulate matter and bacteria and having a high capacity for removal of pyrogenic matter such as bacterial endotoxins and which, in addition, does not have the disadvantages of undesirable extractable matter. Low levels of total extractable matter are also a great benefit to the pharmaceutical industry as it assures the user that purification by filtration of particulate matter does not result in the introduction of other impurities into the desired product. Low levels of extractables are also important to the microelectronics industry for the production of high resistivity particulate-free ultrapure water.

DESCRIPTION OF THE INVENTION

The present invention provides a filter medium comprising a polymeric fiber matrix, the surfaces of whose fibers are covered with a grafted superstrate polymer (that is, a layer of polymer formed at and covering the surface of the substrate fiber) containing quaternary ammonium groups.

These quaternary ammonium groups may be present at the time of formation of the superstrate or they may be introduced after the superstrate is first formed.

A "matrix", as the term is used herein, indicates a three-dimensional network of interconnected fibers, whether melt-blown, staple, or continuous, which together form a coherent structure suitable for use as a filter medium. Preferred matrices are made from melt-blown thermoplastic polymeric fibers, where the fiber diameter is typically in the range of from about 1 to about 50 $\mu$m. Especially preferred are matrices which are made from melt-blown thermoplastic fibers, have void volumes ranging from about 30 to about 90%, and which have voids which decrease continuously in size from one side of the matrix to the other.

These structures may be in the form of a web, a cylinder, or other geometric shape suitable for incorporation into a filter. Such structures typically have filtration removal ratings ranging from about 0.2 to about 100 $\mu$m in liquid service.

The filter medium of the invention can be made from a pre-existing fiber matrix by a process comprising the graft polymerization of polymerizable ethylenically unsaturated monomeric materials containing pendant unsaturated monomeric materials containing pendant amino or quaternary ammonium groups onto the fibers of said fiber matrix. Alternatively, the fibers themselves can be grafted before being formed into a matrix.

Any ethylenically unsaturated monomer containing an amino or quaternary ammonium group is suitable for use as the grafting monomer as long as it does not also contain any functional group which inhibits the graft polymerization reaction. However, monomers yielding a superstrate in which the ammonium group is incorporated into the grafted polymer via a non-hydrolyzable linkage are more useful. This enables the product to withstand prolonged exposure to hot water and alkaline or acid conditions without loss of its special surface properties.

The presence of quaternary ammonium groups is required to produce a positive zeta potential on the surface of the fibers. Fiber-forming polymers tend to have strong negative zeta potentials. In addition, certain fiber forming processes such as melt spinning or melt blowing create negatively charged functionalities such as carboxyl groups at the fiber negative zeta potential of the polymer. Quaternary ammonium groups, because they bear a full, permanent positive charge, neutralize and overcome the negative zeta potential of the substrate polymer surface. Unquaternized (free) primary, secondary or tertiary amino groups, while they are capable of being protonated in aqueous systems, bear only a partial charge. The degree of protonation and the amount of positive charge associated with such materials is dependent on the pH of the system and is usually small in systems around pH 7. This small amount of positive charge due to amino groups is often not sufficient to overcome the strong negative potential of most polymeric fiber materials.

The grafted superstrate comprises one or more other monomers together with the amino or ammonium group-containing monomer. These monomers may be completely inert or may contain functional groups which confer additional desired properties or exercise control over the surface properties already conferred by the amino or ammonium group-containing monomers provided that they do not also contain functional groups which interfere with the formation of the grafted superstrate. Suitable monomers include polar, non-ionic monomers, for example, hydroxyl-containing monomers, such as hydroxypropyl acrylate (HPA) or hydroxyethyl methacrylate (HEMA), which contain polar, hydrogen-bonding functionalities and tend to impart hydrophilicity to the fiber matrix. The inclusion of a monomer having a hydrophobic moiety, such as methyl methacrylate, can be used to obtain precise control over the final hydrophilicity of the matrix by modifying the effect of monomers conferring hydrophilic characteristics.

Monomers having more than one polymerizable ethylenically unsaturated group may also be used in forming the grafted superstrate. When such monomers are incorporated into the grafted superstrate, the superstrate becomes cross-linked. A cross-linked superstrate is more resistant to change in its molecular conformation and, as a result, provides a fiber matrix whose surface properties are less affected by the chemical environment or by heat.

Certain monomers, such as allyl methacrylate (AMA), which contain both conjugated and nonconjugated polymerizable double bond systems, are particularly effective. These appear to increase the efficiency of grafting the superstrate to polypropylene surfaces which are more difficult to graft to than many other polymer substrates.

The presence of monomers such as AMA, which have more than one polymerizable ethylenically unsaturated group, can be beneficial in another respect. For unknown reasons the treatment of large, non-uniform shaped fiber matrices sometimes results in a matrix in which all surfaces are not treated uniformly. A non-uniform treatment results in local variation in filtration capabilities within the fiber matrix. In general it has been found that the resultant filtration properties of the fiber matrix are similar over a wide range of superstrate compositions when a comonomer such as AMA is present in the compositions.

DESCRIPTION OF PREFERRED EMBODIMENTS

The fiber matrix of this invention may be formed from any synthetic polymer capable of forming fibers and of serving as a substrate for grafting with ethylenically unsaturated monomeric materials. Suitable materials for use as substrates are polymers such as polyolefins, polyesters, polyamides, polysulfones, polyarylene oxides and sulfides, and polymers and copolymers made from halogenated olefins and unsaturated nitriles. It is only required that the material be capable of reacting with ethylenically unsaturated monomers under the influence of ionizing radiation and that the material not be adversely affected by the radiation. Preferred as substrates are polyolefins, polyesters, polyamides, and polymers and copolymers of halogenated olefins and other vinyl polymers. Especially preferred as substrates are polyolefins, polyesters, and polyamides.

The superstrate polymer formed on the fiber substrate may comprise any polymerizable ethylenically unsaturated monomer which either contains an ammonium group or a functionality which is capable of being converted to an ammonium group. For example, the monomer may contain primary, secondary or tertiary amino groups, and then any primary, secondary, or tertiary amine groups in the grafted superstrate may be quaternized in situ. Suitable are such monomers as the quaternized derivatives of aminoalkyl acrylates and methacrylates such as the methochlorides of dimethylaminoethyl acrylate or methacrylate, quaternized aminoalkyl acrylamides and methacrylamides such as MAPTAC (methacrylamidopropyltrimethylammonium chloride), styrenic compounds such as the methochloride of dimethylaminostyrene, and vinylic compounds such as dimethyldiallylammonium chloride (DMDAC). Preferred are those monomers which are derivatives of acrylic and methacrylic acids such as the acrylates, methacrylates, acrylamides and methacrylamides, and DMDAC. Especially preferred is DMDAC because it forms easily into a superstrate and is the least toxic of the available quaternary materials. DMDAC also forms a superstrate into which the quaternary ammonium group is incorporated by means of a non-hydrolyzable chemical linkage.

It is preferred to form a superstrate which contains in addition to the amino or ammonium group-containing monomer, a polar, hydrogen-bonding, non-ionic, polymerizable, ethylenically unsaturated monomer.

Preferred as polar, hydrogen-bonding monomers are the lower hydroxyalkyl acrylates and methacrylates. More preferred are HPA and HEMA. Especially preferred is HEMA.

It is only required that the grafted superstrate contain sufficient quaternary ammonium groups to overcome the negative potential inherent at the fiber surface. The required amount may be achieved by forming a thin superstrate containing a large proportion of quaternary ammonium groups. It is undesirable to form very thick superstrates on filter materials because they may partly block the voids of the matrix and reduce the permeability of the filter. Therefore, it is desired that the superstrate be as small as possible and contain as high a proportion of quaternary ammonium groups as possible. In this embodiment, the monomer-containing quaternary ammonium groups will generally comprise at least about 50% by weight of the superstrate (the balance comprising the non-ionic polar monomer) and the content of nitrogen in the superstrate will be at least about 5% by weight. It is preferred that the quaternary ammonium group-containing monomer comprise from about 50% by weight to about 85% by weight of the superstrate (the balance comprising the non-ionic polar monomer). It is especially preferred that the quaternary ammonium group-containing monomer comprise from about 50% by weight to about 70% by weight of the superstrate (the balance comprising the non-ionic polar monomer).

It is most preferable to form a superstrate which contains, in addition to the quaternary ammonium group-containing monomer and the polar, non-ionic monomer, a monomer containing more than one polymerizable ethylenically unsaturated group. A fiber matrix having a superstrate comprising such monomers will be easily wettable by aqueous fluids, requiring less than about 1 psi of applied pressure to initiate fluid flow through the matrix. Wettability by aqueous fluids is a substantial advantage over unmodified matrices made from synthetic fibers. Such matrices tend to be hydrophobic and require the application of several psi of fluid pressure to initiate flow.

When the superstrate comprises a monomer containing more than one polymerizable ethylenically unsaturated group, the fiber matrix is generally more resistant to the loss of positive surface charge during exposure to harsh environments such as prolonged dry heat such as may be encountered during manufacturing operations commonly used in filter manufacture. When a monomer having more than one polymerizable ethylenically unsaturated group is not used, the resultant matrix is more susceptible to loss of positive surface charge under those conditions.

Preferred as monomers having more than one polymerizable ethylenically unsaturated group are monomers such as polymethacrylate and polyacrylate esters of polyols, for example, diethylene glycol dimethacrylate, pentaerithritol triacrylate, etc., acrylate or methacrylate esters of ethylenically unsaturated alcohols such as AMA, and materials such as triallyl trimellitate, divinylbenzene and other small monomers having more than one polymerizable ethylenically unsaturated functional group. More preferred are the acrylate and methacrylate esters of polyols and AMA. Especially preferred is AMA because of its reactivity with a wide variety of polymerizable monomers and the fact that it is sufficiently soluble in solutions of high water content without the aid of an organic cosolvent. The proportion of monomers containing two or more polymerizable ethylenically unsaturated groups in the superstrate is small and can be up to about 2.5% by weight but is generally within a range of from about 0.5 to about 1.0% by weight.

The fiber matrix of this invention is preferably formed by contacting a pre-existing fiber matrix or fibers suitable for forming such a matrix with a grafting solution comprising the polymerizable ethylenically unsaturated monomer(s) described above and exposing the fibers or matrix to ionizing radiation under conditions which polymerize the monomer(s) and result in a superstrate polymer conferring the desired surface properties, which superstrate polymer is bonded to the surfaces of the substrate fibers or fiber matrix.

When the amino or ammonium group-containing monomer is used in conjunction with a polar, hydrogen-bonding, non-ionic, polymerizable, ethylenically unsaturated monomer, such as the hydroxyalkyl acrylates or methacrylates, the amino or ammonium group-containing monomer may be present in the grafting solution in an amount ranging from about 0.1% to about 10% by weight and more preferably between about 0.25% and about 5% by weight. The more amenable the material from which the fibers are formed is as a substrate for graft polymerization, the lower the concentration of monomer required to achieve the desired effect. Especially preferred are concentrations ranging from about 0.3% to about 3% by weight. The polar, hydrogen-bonding, non-ionic, polymerizable ethylenically unsaturated monomer may be present in an amount ranging from about 0.1% to about 10% by weight, more preferably from about 0.25% to about 5% by weight, and especially preferred are concentrations ranging from about 0.3% to about 2% by weight.

In a preferred embodiment of this invention the superstrate polymer comprises a quaternized amino or ammonium group-containing monomer, a polar, hydrogen-bonding, non-ionic, polymerizable ethylenically unsaturated monomer, such as HEMA, and a monomer having more than one polymerizable ethylenically unsaturated group such as AMA. In this preferred embodiment of the invention the amino or ammonium group-containing monomer may be present in the grafting solution in concentrations ranging from about 0.1% to about 4% by weight, more preferably from about 0.25% to about 3% by weight. Especially preferred are concentrations of from about 0.3% to about 2% by weight. The polar, hydrogen-bonding, non-ionic, polymerizable ethylenically unsaturated monomer may be present in amounts ranging from about 0.25% to about 3% by weight. More preferably it is present in amounts from about 0.3% to about 2% by weight. Especially preferred are concentrations from about 0.3% to about 1.5% by weight. The monomer containing more than one ethylenically unsaturated group may be presented in the grafting solution at concentrations ranging from about 0.005% to about 0.03% by weight and more preferably from about 0.01% to about 0.025% by weight. Especially preferred are concentrations from about 0.01% to about 0.02% by weight.

The weight ratio of amino or ammonium group-containing monomer in the solution to the total of the other copolymerizable monomers, when other copolymerizable monomers are present, may vary from about 1:1 to about 10:1. More preferably the ratio may range from about 1:1 to about 3:1. It is especially preferred that the ratio be approximately 1:1.

To form the grafting solution, the monomer(s) may be dissolved in any solvent or combination of solvents which is capable of dissolving all of the monomers together and which does not interfere with the formation of the superstrate polymer. When amino or quaternary ammonium group-containing monomers are used together with HEMA and AMA, the preferred solvent is water. However, if monomers are used which are not fully soluble in water, an amount of a water-miscible inert organic cosolvent such as 2-methylpropan-2-ol may be added in an amount sufficient to enable complete dissolution of the monomers. Such solvents, however, tend to decrease the solubility of quaternary ammonium group-containing monomers such as DMDAC. Hence, these cosolvents should not be added in an amount so large that the ammonium group-containing monomer becomes insoluble.

The fibers or fiber matrix may be contacted with the polymerizable monomer solution by any appropriate means. A fibrous web may be saturated by passing it through a bath of the solution if the web can be easily wetted by the solution. If the web is not easily wetted by the solution, mechanical means may be used to force solution into the web. The web may be passed over a vacuum drum which draws monomer through the web as it passes over the drum to increase the efficiency of the impregnation process. The saturated web is then rolled up and placed into a container filled with excess monomer solution and which is suitable for holding the web during formation of the grafted superstrate.

If the fiber matrix is in the form of an article, such as a cylindrical filter element, the matrix may be saturated with the solution of monomers by immersion in the liquid. Alternatively, the solution may be forced through the articles by the application of pressure across the article to initiate flow or to increase the efficiency of the process. Alternatively, either fibers, a fibrous web, or a shaped fiber matrix may be first placed in a container suitable for holding the matrix during formation of the grafted superstrate. The container is then sealed, evacuated, and then filled with the monomer solution. If this method is used, the monomer solution must be thoroughly degassed prior to filling the container. In any case, all the surface area of the fibers or fiber matrix should be in contact with an excess of the monomer solution during formation of the superstrate to ensure complete coverage of the surface with the grafted superstrate.

The superstrate polymer is formed by exposing the fibers or matrix to ionizing radiation while in contact with the monomer solution. Any source of ionizing radiation may be used, provided that the radiation is capable of initiating graft polymerization but it is preferred that the radiation is gamma radiation. Especially preferred is gamma radiation from a $^{60}$Co source. Irradiation at any dose rate is acceptable provided it enables formation of a superstrate having the desired surface properties and the fibers are not damaged by the radiation. Dose rates from about 1 to about 1,000 kilorads/hr and preferably from about 5 to about 100 kilorads/hr may be used. In general, higher dose rates have been found effective in forming a superstrate on substances which appear to react poorly with the ammonium or amino group-containing monomer when no other comonomers are present. A dose rate of about 10 kilorads/hr for a total dose of about 0.2 Mrads is especially preferred for forming a superstrate from DMDAC, HEMA, and AMA on a polypropylene fiber matrix. Total doses in the range of from about 0.05 to about 5 Megarads may be used.

After irradiation and formation of the superstrate the fibers or fiber matrix is washed with water to remove polymeric debris that is not bonded to the substrate. Any means of washing which causes water to flow across all the fibers, either loose or in a matrix, is appropriate, provided that it is carried out sufficiently to remove all the unbound debris. Particularly effective for washing a fiber matrix is flowing deionized water through the matrix for about 5 hours at a flow rate of about ¼ gallons per minute (gpm) for each 100 square inches of external surface area.

Debris, which is substantially a polymer formed from the monomer(s) used to form the superstrate but which is not bound to the substrate, is often present as a gelatinous material which can adhere to the fibers or the matrix. It has been found that, when DMDAC is used as one of the monomers, addition of a small amount of poly(dimethyldiallylammonium chloride) to the monomer solution substantially reduced the amount of gelatinous debris.

After washing, the fibers or fiber matrix may be dewatered and/or dried and used for further processing. Drying conditions of up to about 95° C. for up to about 14 hours have been found satisfactory.

The preparation and evaluation of fiber matrices having surface properties controlled by superstrates comprising quaternary ammonium group-containing monomers is described in the Examples below.

Pore sizes (also referred to as removal ratings) of the unmodified filter media were determined according to the Oklahoma State University (OSU) F-2 test as described in the general technical literature related to filtration and in Pall technical bulletin HDC-600a, dated October, 1981. Measurement of pore sizes below about 0.5 μm can be carried out using organisms such as *Pseudomonas diminuta*, according to generally accepted techniques.

GENERAL PROCEDURE FOR PREPARATION OF A SHAPED FIBER MATRIX HAVING CONTROLLED SURFACE PROPERTIES

A surface-controlling superstrate was formed on polymer microfiber matrices in the form of cylindrical filter elements by first placing the filter elements into a cylindrical stainless steel vessel having a cover with an O-ring seal. The vessel and seal must be sufficiently strong to maintain a full vacuum inside the container. After the vessel was loaded, it was covered and sealed, and evacuated by means of a vacuum pump until the pressure inside the vessel was 200 μm of mercury or less.

The vessel was shut off from the vacuum source without re-admitting air into the vessel. Then a solution containing the amino group- or quaternary ammonium group-containing monomers and, optionally, other polymerizable ethylenically unsaturated monomers was admitted to the vessel until the vessel was filled with the solution. After the vessel was full it was disconnected from the supply of monomer solution and sealed. The sealed vessel containing the fiber matrices and solution of monomers was then exposed to gamma radiation from a $^{60}$Co source. After irradiation, the filter elements were removed from the solution of monomers and then washed by flowing deionized water (approximately 0.5 MΩ·cm resistivity) at room temperature through the filter elements in the reverse direction at a flow rate of about ¼ gpm for 5¼ hours. Excess water was removed from the filter elements by suction and the filter elements were dried in an air oven at 95° C. for 14 hours.

GENERAL PROCEDURE FOR MEASURING ZETA POTENTIAL

Zeta potential was measured using a ¼ inch diameter × ¼ inch thick cylindrical plug of fiber matrix. When zeta potential of the medium from a Profile$^R$ filter was measured the sample was cut from the innermost ¼ inch of filter medium (nearest the core of the filter). When zeta potential of a fibrous web was measured the sample was cut from a ¼ inch thick stack of webs.

The zeta potential was measured by placing the sample in an acrylic filter holder which held the sample snugly between two platinum wire screens 100×100 mesh (i.e., 100 wires in each direction per inch). The meshes were connected, using copper wire, to the terminals of a Triplett Corporation model 3360 Volt-Ohm Meter, the mesh on the upstream side of the sample being connected to the positive terminal of the meter. A pH-buffered solution was flowed through the sample using a differential pressure of 45 inches of water column across the filter holder and the effluent was collected. For measurements at pH 7, a buffered solution was made by adding 6 ml pH 7 buffer (Fisher Scientific Co. catalog number SB108-500) and 5 ml pH 7.4 buffer (Fisher Scientific Co. catalog number SB110-500) to 1 liter pyrogen-free deionized water. For measurements at pH 9, a buffered solution was made by adding 6 ml pH 9 buffer (Fisher Scientific Co. catalog number SB114-500) and 2 ml pH 10 buffer (Fisher Scientific Co. catalog number SB116-500) to 1 liter pyrogen-free deionized water. The electrical potential across the filter holder was measured during flow (it required about 30 seconds of flow for the potential to stabilize) and was corrected for cell polarization by subtracting from it the electrical potential measured when flow was stopped. During the period of flow the pH of the liquid was measured using a Cole-Parmer model J-5994-10 pH meter fitted with an in-line model J-5993-90 pH probe. The conductivity of the liquid was measured using a Cole-Parmer model J-1481-60 conductivity meter fitted with a model J-1481-66 conductivity flow cell. Then the polarity of the volt meter was reversed, and the effluent was flowed backwards through the filter holder using a differential pressure of 45 inches of water column. As in the first instance the electrical potential measured during flow was corrected for cell polarization by subtracting from it the electrical potential measured after flow was stopped. The average of the two corrected potentials was taken as the streaming potential.

The zeta potential of the fiber matrix was derived from the streaming potential using the following relationship (J. T. Davis et al., *Interfacial Phenomena*, Academic Press, New York, 1963):

$$\text{Zeta Potential} = \frac{4 \pi n}{DP} \cdot E_S \lambda$$

where n is the viscosity of the flowing solution, D is its dielectric constant, $\lambda$ is its conductivity, $E_S$ is the streaming potential and P is the pressure drop across the sample during the period of flow. In these tests the quantity $4 \pi \eta / DP$ was equal to 0.800.

Filter media in accordance with this invention have positive zeta potentials in aqueous solution at approximately neutral pH. Preferably, they have a positive zeta potential under mildly alkaline conditions, for example, at a pH as high as 9.

GENERAL PROCEDURE FOR MEASURING LATEX ADSORPTION CAPACITY (L.A.C.)

Latex Adsorption Capacity (L.A.C.) was measured using a ¼ inch diameter×¼ inch thick cylindrical plug of fiber matrix. To ensure that the sample size was uniform in each test each sample was trimmed to a weight of 0.10 g. When L.A.C. of the medium from a Profile$^R$ filter was measured the sample was cut from the innermost ¼ inch of the filter medium (nearest the core of the filter). When L.A.C. of a fibrous web was measured the sample was cut from a ¼ inch thick stack of webs.

The L.A.C. was measured by placing the sample in a filter holder made to accommodate they cylindrical plug of fiber matrix and passing a suspension of 0.1% by weight monodisperse polystyrene latex particles in water through the matrix at a rate of 3 ml/min using a hand-held syringe. The latex particles are a product of Dow Diagnostics, Inc., and their size was chosen to be between about ¼ and about ¼ the removal rating of the filter material tested. Latex particles used in the following examples were 0.527 μm and 0.285 μm in diameter. The effluent of the filter was collected until latex particles were detected in the effluent by visual observation of turbidity in the effluent. The amount of the 0.1% by weight suspension of latex in water which passed through the matrix until detection of latex in the effluent was measured and this amount (in ml) was reported as Latex Adsorption Capacity (L.A.C.).

Filter media in accordance with this invention have enhanced L.A.C.'s when compared with the substrate, i.e., the fibrous matrix or fibers which form the base for the superstrate which is chemically bonded to the substrate. Generally, the filter media of this invention have L.A.C.'s of at least about 0.5 ml, preferably at least about 0.8 ml and most preferably at least about 1.2 ml.

Examples 1-3 demonstrate that polymerizable ethylenically unsaturated monomers containing quaternary ammonium groups may be used to produce a polypropylene fiber matrix which has a positive surface charge in aqueous systems at approximately neutral pH.

EXAMPLE 1

A shaped polypropylene matrix in the form of a Profile$^R$ R1F005 filter cartridge (a cylindrical filter cartridge 10¼ inches in length and 2¼ inches in diameter with a removal rating of 0.5 μm commercially available from Pall Corporation made from melt-blown polypropylene microfibers with a pore size which decreases continuously from the outside to the inside of the cylinder) was treated in accordance with the General Procedure. The monomer solution was a solution containing 8% by weight DMDAC (a product of CPS Chemical Co.) and 1% by weight HEMA (supplied under the designation BM-920, a product of Rohm Tech, Inc.), the balance being deionized water. The gamma radiation was applied at a dose rate of 50 kilorads/hr over a period of 20 hours for a total radiation dose of 1 Megarad.

After being washed and dried the innermost ¼ inch of the filter cartridge was tested for surface charge according to the General Procedure for Measurement of Zeta Potential. The product of this Example had a zeta potential of +7 mV at pH 6.8 (as compared with −45 mV for a similar but untreated Profile $^R$ filter referred to herein as "Control"). This is summarized in Table I below.

EXAMPLE 2

A Profile$^R$ R1F005 filter cartridge was treated as described in Example 1 except that, instead of containing DMDAC as the quaternary ammonium group-containing monomer, the monomer solution contained 3.0% by weight MAPTAC (a product of Rohm Tech, Inc.).

When washed and dried and tested for surface charge as described in Example 1, the material was found to have a zeta potential of +13 mV at pH 7.3. This indicates that MAPTAC is also effective in controlling the surface properties of the fiber matrix. This information is summarized in Table I below.

EXAMPLE 3

A Profile $^R$ R1F005 filter was treated as described in Example 1 except that the monomer solution consisted of 2.7% solids by weight FM-1Q75MC (a solution of 75% by weight of dimethylaminoethyl methacrylate methochloride in water, a product of CPS Chemical Co.) and 1.0% by weight N-vinylpyrrolidone (NVP, a product of Aldrich Chemical Co.), the balance being water.

When washed and dried and tested for surface charge as described in Example 1, the material was found to have a zeta potential of +9 mV at pH 6.9. This indicates that FM-1Q75MC is effective in controlling the surface properties of the fiber matrix. It also indicates that N-vinylpyrrolidone is effective in acting as comonomer with a quaternary ammonium group-containing monomer instead of HEMA.

TABLE I

| Filter of Example | Quaternary Monomer | Conc. | Comonomer | (Conc.) | Zeta Potential at pH ≈ 7 |
|---|---|---|---|---|---|
| 1 | DMDAC | 8% | HEMA | 1% | +7 mV |
| 2 | MAPTAC | 3% | HEMA | 1% | +13 mV |
| 3 | FM-1Q75MC | 2.7% | NVP | 1% | +9 mV |
| Control | untreated | — | — | — | −45 mV |

NVP = N-vinylpyrrolidone

EXAMPLE 4

A Profile $^R$ R1F005 filter cartridge was treated as described in Example 1 except that the concentration of DMDAC was 0.5% by weight, the concentration of HEMA was 0.5% by weight, and the irradiation dose rate was 10 kilorads/hr.

When washed and dried and tested for surface charge as described in Example 1, the product of this Example was found to have a zeta potential of −25 mV at pH 7 and a zeta potential of −35 mV at pH 9.

The Latex Adsorption Capacity of the product of this Example was also measured according to the Latex Adsorption Capacity Test Procedure and was found to be 0.8 ml, a significant increase in capacity over that of an untreated Profile$^R$ filter cartridge of the same type, referred to in Table II below as "Control".

This indicates that the amounts of DMDAC and HEMA used were insufficient to form a product having a positive zeta potential at pH 7. However, even these small amounts of monomers were sufficient to form a superstrate on the fiber. The number of positively charged sites on the fiber surface was sufficient to enable capture of a significant amount of latex particles which would not be captured by the untreated filter material, even though the treated filter material has a negative zeta potential in water.

EXAMPLE 5

A Profile$^R$ R1F005 filter cartridge was treated as described in Example 4 except that the monomer solution also contained 0.01% by weight AMA (a product of CPS Chemical Co.).

When washed and dried and tested for surface charge as described in Example 1, the product of this Example was found to have a zeta potential of +15 mV at pH 7 and a zeta potential of +8 mV at pH 9. Its Latex Adsorption Capacity was measured according to the Latex Adsorption Capacity Test Procedure and found to be 1.2 ml. This indicates that the presence of even a small amount of AMA as a comonomer in the surface-controlling superstrate causes the product to have a positive zeta potential at pH 7 whereas without the AMA the zeta potential is negative. This information is summarized in Table II below.

TABLE II

| Filter of Example | DMDAC (%) | HEMA (%) | AMA (%) | Zeta Potential pH 7 | Zeta Potential pH 9 | L.A.C. (ml) |
|---|---|---|---|---|---|---|
| 4 | 0.5 | 0.5 | — | −25 | −35 | 0.8 |
| 5 | 0.5 | 0.5 | 0.01 | +15 | +8 | 1.2 |
| Control | — | — | — | −45 | | 0.0 |

L.A.C. = Latex Adsorption Capacity

Examples 6–9 illustrate the ranges of concentration over which AMA is effective as a cross-linking comonomer and that when AMA is present as a comonomer low dose rates and doses are effective in forming a surface-controlling superstrate.

EXAMPLE 6

A Profile$^R$ R1F020 filter cartridge (a cylindrical filter cartridge of similar structure to the R1F005 but with a removal rating of 2 μm available from Pall Corporation) was treated as described in Example 5, except that the concentration of AMA in the monomer solution was 0.005% by weight.

When washed and dried and tested for surface charge as described in Example 1, the product of this Example was found to have a zeta potential of −10 mV at pH 8.6.

When examined according to the Latex Adsorption Capacity Test Procedure, the product of this Example showed a Latex Adsorption Capacity of 1.7 ml. This indicates that, while levels of AMA as low as 0.005% improve the filtration properties of the fiber matrix, the improvement is only modest and the zeta potential is not positive at a pH which is mildly alkaline, such as pH 9. The zeta potential and latex adsorption data are summarized in Table III below.

EXAMPLE 7

A Profile$^R$ R1F020 filter cartridge was treated as described in Example 6, except that the concentration of AMA in the monomer solution was 0.01% by weight.

When washed and dried and tested for surface charge as described in Example 1, the product of this Example was found to have a zeta potential of +3 mV at pH 8.7.

When examined according to the Latex Adsorption Capacity Test Procedure, the product of this Example showed a Latex Adsorption Capacity of 3.4 ml. This indicates that, when AMA is present at a concentration as high as 0.01% by weight in the monomer solution, the fiber matrix produced has a positive zeta potential even in mildly alkaline systems. The Latex Adsorption Capacity was also substantially higher than when AMA was present at 0.005% by weight. The zeta potential and latex adsorption data are summarized in Table III below.

EXAMPLE 8

A Profile$^R$ R1F005 filter cartridge was treated as described in Example 6, except that the concentration of AMA in the monomer solution was 0.025% by weight.

When washed and dried and tested for surface charge as described in Example 1, the product of this Example was found to have a zeta potential of +3 mV at pH 9.

When examined according to the Latex Adsorption Capacity Test Procedure, the product of this Example showed a Latex Adsorption Capacity of 5.8 ml. This indicates that, when the concentration of AMA in the monomer solution is increased to a level of 0.025% by weight, the latex adsorption capacity of the product is significantly increased over that obtained when AMA is present at only 0.01% by weight. However, the increased amount of AMA led to a high level of gels and intractable impurities in the filter material. The zeta potential and latex adsorption data are summarized in Table III below.

EXAMPLE 9

A Profile$^R$ R1F020 filter cartridge was treated as described in Example 8 except that the gamma irradiation dose rate was 3 kilorads/hr and, hence, the total radiation dose was 0.06 Megarad.

When washed and dried and tested for surface charge as described in Example 1, the product of this Example was found to have a zeta potential of +20 mV at pH 8.9. The Latex Adsorption Capacity of the product of this Example was also measured according to the Latex Adsorption Capacity Test Procedure and was found to be 3.2 ml. The high positive zeta potential at pH 8.9 and a Latex Adsorption Capacity about the same as that of the product of Example 8 indicate that a radiation dose rate of 3 kilorads/hr is as adequate for forming the surface-controlling superstrate as higher dose rates. The zeta potential and latex adsorption data are summarized in Table III below.

TABLE III

| Filter of Example | DMDAC (Conc.) | HEMA (Conc.) | AMA (Conc.) | Dose Rate (krads/hr) | Zeta Potential in mV (pH) | L.A.C. (ml) |
|---|---|---|---|---|---|---|
| 6 | 0.5% | 0.5% | .005% | 10 | −10 (8.6) | 1.7 |
| 7 | 0.5% | 0.5% | .01% | 10 | −3 (8.7) | 3.4 |
| 8 | 0.5% | 0.5% | .025% | 10 | −3 (9) | 5.8 |
| 9 | 0.5% | 0.5% | .025% | 3 | +20 (8.9) | 3.2 |

Examples 10-16 illustrate the preparation of an optimized polypropylene fiber matrix prepared according to this invention and its performance with respect to bacterial retention, pyrogen removal, and release of extractable matter.

EXAMPLE 10

A Profile$^R$ R1F005 filter cartridge was treated as described in Example 8 except that DMDAC was present in the monomer solution at a concentration of 0.7% by weight, HEMA was present at a concentration of 0.7% by weight, and AMA was present at a concentration of 0.014% by weight.

When washed and dried and tested for surface charge as described in Example 1, the product of this Example was found to have a zeta potential of +14 mV at pH 8.6. The Latex Adsorption Capacity of the product of this Example was measured according to the Latex Adsorption Capacity Test Procedure and was found to be 1.8 ml.

EXAMPLE 11

A Profile$^R$ R1F010 filter cartridge (a cylindrical filter cartridge of similar structure to the R1F005 but with a removal rating of 1 μm available from Pall Corporation) was treated as described in Example 10. After being washed and dried the filter was tested for its ability to remove the bacterium *Serratia marcescens* from water by passing one liter of a suspension of *S. marcescens* in water through the filter at a flow rate of 0.5 liters/min. The concentration of *S. marcescens* in the suspension was $1.4 \times 10^6$/ml and the total challenge was $1.4 \times 10^9$. The filter effluent was successively diluted volumetrically and each dilution was plated on a 0.2 μm analytical membrane and cultured on Muller-Hinton agar by incubating at 32° C. for one day. The colonies which grew were counted and the number of colony-forming units in the filter effluent was determined by standard microbiological methods. The titer reduction was calculated by dividing the concentration of *S. marcescens* in the influent by the concentration of *S. marcescens* in the effluent; this represents the factor by which the concentration of bacteria was reduced by the filter and is a measure of its effectiveness. No *S. marcescens* were found in the effluent of the filter made according to Example 10 and its titer reduction is reported as $>1.4 \times 10^9$. By contrast, $1.6 \times 10^6$ *S. marcescens* were found in the effluent of an untreated Profile$^R$ R1F005 filter which was tested in the same manner, yielding a titer reduction for that filter of $8.8 \times 10^2$. This information is summarized in Table IV below.

TABLE IV

| Filter of Example | Titer Reduction in *S. marcescens* |
|---|---|
| 11 | $>1.4 \times 10^9$ |
| Control | $8.8 \times 10^2$ |

EXAMPLE 12

A Profile$^R$ R1F010 filter cartridge was treated as described in Example 10. After being washed and dried it was tested for its ability to remove pyrogenic bacterial endotoxins from water by passing 5 liters of water containing $3.2 \times 10^3$ endotoxin units per ml (eu/ml) of purified *E. Coli* 055:B5 Lipopolysaccharide B (product number 3923-10-6 of Difco Laboratories) through the filter cartridge at a flow rate of 500 ml/min. The filter cartridge of this Example removed all the endotoxin (a total of $1.6 \times 10^7$ eu) with which it was challenged. By comparison a Profile$^R$ R1F010 filter cartridge containing no surface-controlling superstrate (referred to as "Control" in Table V) was tested in the same manner. No endotoxin was removed.

This indicates that the surface-controlled fiber matrix of this invention has the ability to remove bacterial endotoxins from water whereas the original matrix without the superstrate does not. This information is summarized in Table V below.

TABLE V

| Filter of Example | Total Endotoxin Loading |
|---|---|
| 12 | $1.6 \times 10^7$ eu |
| Control | 0 eu |

EXAMPLE 13

A Profile$^R$ R1F010 filter cartridge was treated as described in Example 10. After being washed and dried it was tested for its content of extractable matter. The filter cartridge comprised of about 110 grams of fibers and having a voids volume of about 80% was plugged at the bottom end and its upper end was tied to a reciprocating cam having a stroke of approximately 2¼ inches with a cycle time of about 20 seconds. The filter cartridge was submerged in 1,500 ml deionized water contained in a clean glass down in the water by means of the cam for a period of 4 hours. The position of the filter cartridge was adjusted so that its top was fully submerged at the bottom of the reciprocation stroke and was raised approximately 2 inches out of the liquid at the height of the stroke. After 4 hours, the filter cartridge was removed from the water and 1,000 ml of the water was evaporated to dryness, yielding 6.9 grams of a non-volatile residue.

When the filter medium is in the form of a continuous web it may be extracted after being cut into approximately 6 inch by 6 inch squares. The squares may be placed in a stack, each layer being interleaved with a stainless steel wire mesh, and the stack may be reciprocated in water contained in an open container such as a crystallizing dish. The ratio of the amount of water used to the amount of filter material extracted is such that the amount of filter material which would be contained in one 10 inch filter cartridge would be extracted in 1,500 ml water. Alternatively, if the filter material is to be characterized for extractables as an intrinsic property per square foot of web it is appropriate to extract approximately two square feet of filter material in 600 ml water.

Filter media in accordance with the subject invention will generally have extractables when tested in accordance with the Extractable Test Procedure (ETP) described above of less than about 0.2 mg per gram of the filter medium, more preferably less than about 0.1 mg per gram of the filter medium.

EXAMPLE 14

A Profile$^R$ R1F010 filter cartridge was treated as described in Example 10. After being washed and dried it was tested for its ability to produce an effluent having high resistivity and very low levels of organic impurities within a short period of time.

The filter cartridge was placed in a filter housing and high resistivity deionized water (18.2 MΩ·cm resistivity) was flowed through the filter cartridge at a rate of 2 gpm. The resistivity and TOC (total organic carbon) of the effluent of the filter housing when empty had been measured before the filter cartridge was installed. Resistivity was continuously measured for 3 hours immediately downstream of the filter housing using a Model 832 temperature compensated conductivity/resistivity meter, manufactured by the Thornton Co. (Waltham, Mass.). TOC was continuously measured for 3 hours immediately downstream of the filter housing using a Model A100P TOC Analyzer manufactured by Anatel, Inc. (Boulder, Colo.).

The effluent of the filter produced according to Example 14 had a resistivity of 14 MΩ·cm after 5 min. The effluent of the filter produced according to Example 14 reached the resistivity of the influent (18.2 MΩ·cm) in about 20 min. This information is summarized in Table VI below.

TABLE VI

| Filter of Example | Water-Soluble Extractables | Time to 14 MΩ · cm | Time to 18.2 MΩ · cm | Time to <5 ppb |
|---|---|---|---|---|
| 14 | 6.9 mg | 5 min | 20 min | 1 hr |

Filter media in accordance with the subject invention will generally rinse up to provide an effluent with a resistivity of 18 MΩ·cm when tested as described in Example 14 within about 45 minutes, preferably within about 30 minutes, and more preferably within about 20 minutes.

EXAMPLE 15

A shaped polypropylene microfiber matrix in the form of a rolled-up continuous 10 inch wide web having a basis weight of 4 g/ft$^2$ and a removal rating of 5 µm was prepared as described in Example 8 except that, when the rolled-up web was removed from the vessel in which the web was irradiated, it was washed by flowing deionized water tangentially across the web through the roll. This was accomplished by first placing the roll on its side and wrapping a solid polyester film completely around the roll so that it formed a cylinder with one edge of the film flush with the edge of the roll and the other edge about 18 inches above the top edge of the roll. The core around which the web was rolled was then plugged and the space above the roll formed by the cylindrical wrap of film was filled with deionized water. The water flow was maintained at such a rate that a head of about 18 inches of water was maintained throughout the washing period, which was about 16 hours.

A piece of the washed web was dried as described in the General Procedure and its surface charge was measured. The zeta potential was found to be +15 mV at pH 9, indicating that a surface-controlling superstrate can be formed on a fiber matrix in the form of a web as well as in other forms.

EXAMPLE 16

A continuous web of poly(butylene terephthalate) fibers was treated as described in Example 15 except that the monomer solution contained 0.7% by weight DMDAC, 0.7% by weight HEMA, and 0.014% by weight AMA. The web had a basis weight of 5.2 g/ft$^2$ and a removal rating of about 5 µm.

After being washed and dried the web was examined for surface charge as described in Example 15. The web had a zeta potential of +15 mV at pH 7.1. This indicates that a surface-controlling superstrate may be formed on a polyester fiber matrix in accordance with this invention.

We claim:

1. A filter medium comprising a synthetic polymeric fiber matrix having a filtration removal rating from about 0.2 microns to about 100 microns, to whose surfaces are bonded a superstrate comprising a polymer with quaternary ammonium groups made from an ethylenically unsaturated monomer containing an amino or quaternary ammonium group and a polar, non-ionic monomer, said filter medium having a positive zeta potential at pH 7.

2. The filter medium of claim 1 wherein the fibers of the matrix are formed from a substance having C—H bonds capable of forming radicals under the influence of ionizing radiation.

3. The filter medium of claim 1 wherein the fibers of the matrix are formed from a polyolefin.

4. The filter medium of claim 3 wherein the polyolefin is polypropylene.

5. The filter medium of claim 1 wherein the fibers of the matrix are formed from a polyamide.

6. The filter medium of claim 5 wherein the polyamide is nylon 6.

7. The filter medium of claim 1 wherein the fibers of the matrix are formed from a polyester.

8. The filter medium of claim 7 wherein the polyester is polybutylene terephthalate.

9. The filter medium of claim 1 wherein the quaternary ammonium group is incorporated into the superstrate polymer via a non-hydrolyzable chemical linkage.

10. The filter medium of claim 1 wherein said superstrate polymer comprises a non-ionic ethylenically unsaturated monomer.

11. The filter medium of claim 10 wherein said non-ionic ethylenically unsaturated monomer is a hydroxyalkyl ester of acrylic or methacrylic acid.

12. The filter medium of claim 11 wherein said non-ionic ethylenically unsaturated monomer is hydroxyethyl methacrylate.

13. The filter medium of claim 12 wherein the superstrate comprises a monomer containing more than one polymerizable ethylenically unsaturated group.

14. The filter medium of claim 13 wherein the quaternary ammonium group is incorporated into the superstrate polymer via a non-hydrolyzable chemical linkage.

15. The filter medium of claim 13 wherein the fibers of the matrix are formed from a polyolefin.

16. The filter medium of claim 15 wherein said polyolefin is polypropylene.

17. The filter medium of claim 13 wherein the fibers of the matrix are formed from a polyester.

18. The filter medium of claim 17 wherein the polyester is poly(butylene terephthalate).

19. The filter medium of claim 13 wherein the fibers of the matrix are formed from a polyamide.

20. The filter medium of claim 19 wherein the polyamide is nylon 6.

21. The filter medium of claim 10 wherein said filter medium has a positive zeta potential in aqueous systems at pH 9.

22. The filter medium of claim 1 wherein the fiber matrix is in the form of a web.

23. The filter medium of claim 1 wherein the filter medium is in the form of a shaped article.

24. The filter medium of claim 23 wherein the shaped article has the form of a cylinder.

25. The filter medium of claim 24 wherein the pore size of the filter medium varies as a function of the distance from the axis of the cylinder.

26. The filter medium of claim 1 wherein said ethylenically unsaturated monomer containing an amino or quaternary ammonium group is dimethyldiallylammonium chloride.

27. The filter medium of claim 26 wherein said polar, non-ionic monomer is a polar hydrogen-bonding, non-ionic, polymerizable, ethylenically unsaturated monomer.

28. The filter medium of claim 27 wherein said polar, non-ionic monomer is hydroxyethyl methacrylate.

29. The filter medium of claim 27 wherein said polar, non-ionic monomer is hydroxypropyl acrylate.

30. The filter medium of claim 27 wherein said polar, non-ionic monomer is allyl methacrylate.

31. A method for the filtration of particulates from a fluid medium comprising passing the fluid medium through a filter medium comprising a synthetic polymeric fiber matrix having a filtration removal rating from about 0.2 microns to about 100 microns, to whose surfaces are bonded a superstrate comprising a polymer with quaternary ammonium groups made from an ethylenically unsaturated monomer containing an amino or quaternary ammonium group and a polar, non-ionic monomer, said filter medium having a positive zeta potential at pH 7.

32. A filter medium comprising a synthetic, polymeric fiber matrix having a filtration removal rating from about 0.2 microns to about 100 microns, to whose surfaces are bonded a superstrate comprising a polymer with quaternary ammonium groups made from an ethylenically unsaturated monomer containing an amino or quaternary ammonium group, hydroxyethyl methacrylate, and allyl methacrylate.

33. The filter of claim 32 wherein said ethylenically unsaturated monomer is dimethyldiallylammonium chloride.

* * * * *

UNITED STATES PATENT AND TRADEMARK OFFICE
CERTIFICATE OF CORRECTION

PATENT NO. : 5,133,878

DATED : July 28, 1992

INVENTOR(S) : THOMAS C. GSELL, ISAAC ROTHMAN, PAUL C. SMITH, III, AND JEFFREY K. CHAMBERS

It is certified that error appears in the above-identified patent and that said Letters Patent is hereby corrected as shown below:

Column 8, line 50, delete "$5\frac{1}{4}$" and substitute therefor -- $5\frac{1}{2}$ --;

Column 8, lines 56, 59 and 62, delete "$\frac{1}{4}$" and substitute therefor -- $\frac{1}{2}$ --;

Column 9, line 14, delete "SBI16-500" and substitute therefor -- SB116-500 --;

Column 9, lines 37-40, in the formula delete "n" and substitute therefor -- $\eta$ --;

Column 9, line 41, delete "n" and substitute therefor -- $\eta$ --;

Column 9, lines 55,(1st occurrence) 60 and 62, delete "$\frac{1}{4}$" and substitute therefor -- $\frac{1}{2}$ --;

UNITED STATES PATENT AND TRADEMARK OFFICE
CERTIFICATE OF CORRECTION

PATENT NO. : 5,133,878
DATED : July 28, 1992
INVENTOR(S) : THOMAS C. GSELL, ISAAC ROTHMAN, PAUL C. SMITH, III, AND JEFFREY K. CHAMBERS It is certified that error appears in the above-identified patent and that said Letters Patent is hereby corrected as shown below:

Col. 10, line 2, delete "¼"(1st occurrence) and substitute therefor -- ½ --;

Column 10, line 28, delete "2¼" and substitute therefor -- 2½ --;

Column 10, line 43, delete "¼" and substitute therefor -- ½ --;

Column 15, line 5, delete "2¼"" and substitute therefor -- 2½" --; and

Column 15, line 8, insert after the word "glass" this phrase -- 2,000 ml graduated cylinder and was moved up and --.

Signed and Sealed this

Twenty-fourth Day of August, 1993

Attest:

BRUCE LEHMAN

*Attesting Officer*   *Commissioner of Patents and Trademarks*